(12) United States Patent
Bruhis

(10) Patent No.: US 8,757,013 B1
(45) Date of Patent: Jun. 24, 2014

(54) FORCE TRANSDUCER WITH SEPARATELY MOUNTED CALIBRATION RESISTORS

(75) Inventor: Ofer Bruhis, Palo Alto, CA (US)

(73) Assignee: BG Systems, Inc., Palo Alto, CA (US)

( * ) Notice: Subject to any disclaimer, the term of this patent is extended or adjusted under 35 U.S.C. 154(b) by 133 days.

(21) Appl. No.: 13/553,717

(22) Filed: Jul. 19, 2012

Related U.S. Application Data

(60) Provisional application No. 61/509,992, filed on Jul. 20, 2011.

(51) Int. Cl.
*G01L 1/22* (2006.01)

(52) U.S. Cl.
USPC .................................................. 73/862.045

(58) Field of Classification Search
USPC ............................... 73/862.041–862.046, 777
See application file for complete search history.

(56) References Cited

U.S. PATENT DOCUMENTS

| | | | | |
|---|---|---|---|---|
| 3,713,068 A | * | 1/1973 | Talmo | 338/2 |
| 4,628,296 A | * | 12/1986 | Kitagawa et al. | 338/3 |
| 6,427,539 B1 | * | 8/2002 | Chen et al. | 73/726 |
| 6,986,285 B2 | * | 1/2006 | Avisse | 73/726 |
| 2006/0288703 A1 | * | 12/2006 | Kurtz et al. | 60/772 |

* cited by examiner

*Primary Examiner* — Max Noori
(74) *Attorney, Agent, or Firm* — Van Pelt, Yi & James LLP

(57) ABSTRACT

A force transducer with separately mounted calibration resistors is disclosed. In various embodiments, one or more strain gauges are bonded, via glass fusion, onto each of two or more surfaces of a bending beam. Measurements are performed, after bonding the strain gauges, to determine the respective resistances required to be added in series with the respective strain gauges to achieve a balanced bridge. The required calibration resistors are mounted on one or more surfaces of a support block disposed adjacent to the bending beam.

18 Claims, 5 Drawing Sheets

FORCE TRANSDUCER WITH SEPARATELY MOUNTED CALIBRATION RESISTORS

CROSS REFERENCE TO OTHER APPLICATIONS

This application claims priority to U.S. Provisional Patent Application No. 61/509,992 entitled FORCE TRANSDUCER WITH SEPARATELY MOUNTED CALIBRATION RESISTORS filed Jul. 20, 2011 which is incorporated herein by reference for all purposes.

BACKGROUND OF THE INVENTION

A force transducer is used to convert a force into electrical signal. Typically, the force being sensed deforms a strain gauge. The strain gauge measures the deformation (strain) as an electrical signal, because the strain changes the effective electrical resistance of the wire. A force transducer may include four strain gauges in a Wheatstone bridge configuration, as shown in FIG. 1. The output of the force transducer may be plugged into an algorithm to calculate the force applied to the transducer. Typical uses include joystick devices, such as those used in military, industrial, and game systems. For example, a joystick may include a knob or other input structure that a user manipulates using his/her thumb or other finger, to provide a force input, such as to move a cursor, robotic arm, etc.

A strain gauge typically comprises a small resistor that is attached to the object, conventionally by epoxy or cyanoacrylate glue. As the object deforms proportionally to the force applied, the gauge follows it and changes its resistance. In order to achieve a balanced bridge, in the typical prior art approaches the four gauges/resistors used are a carefully 'matched set' with very similar resistance and temperature properties. Resistors having very nearly identical resistance are located within a lot or other population of candidates and used together as a matched set. Pairing these resistors can be a complicated and costly process.

BRIEF DESCRIPTION OF THE DRAWINGS

Various embodiments of the invention are disclosed in the following detailed description and the accompanying drawings.

DETAILED DESCRIPTION

Figure 1:
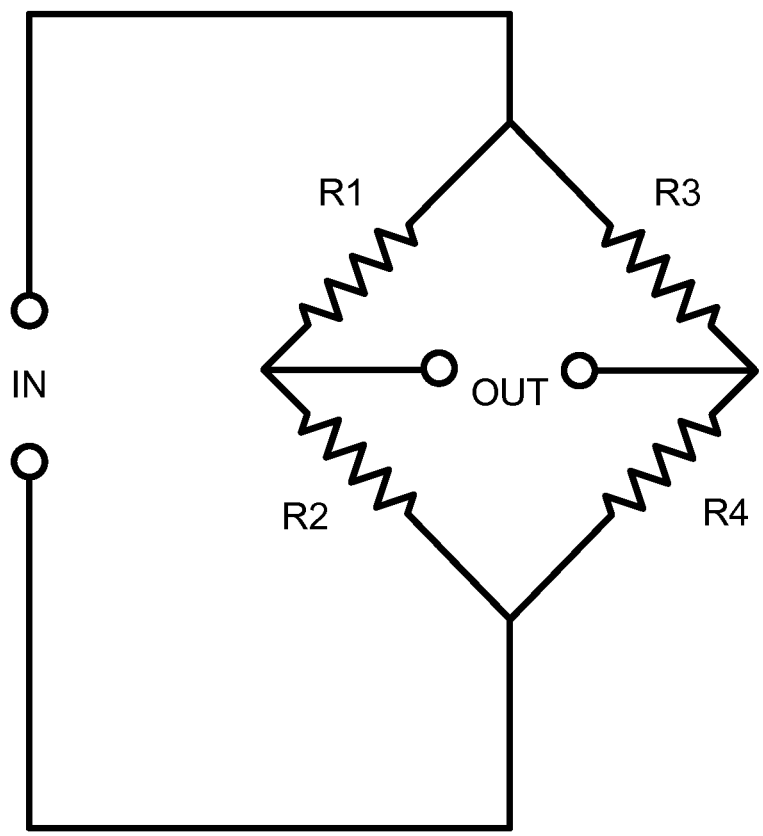
FIG. 1 is a circuit diagram illustrating an embodiment of strain gauges arranged in a Wheatstone bridge configuration.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A force transducer comprising strain gauges made using resistors that have not been matched carefully in advance of manufacture of the force transducer is disclosed. In various embodiments, strain gauges made from resistors that have the same nominal characteristics are placed using new bonding technologies, such as glass fusion, and separate calibration or other correction resistors are added after primary resistor bonding to adjust for any differences as required to balance the bridge. In some embodiments, surface-mounted (SMD) miniature resistors are used to balance the bridge. The resistors are added in series to the gauges and are chosen in a way to compensate for the irregularities in the gauges. This eliminates the requirement for the costly matched gauge set. A support structure on which to mount the resistors used to balance the bridge is disclosed. Variation in the diameter of the force transducer's beam in some embodiments allows different bending moments for the same maximum output, enabling a desired manner and degree of user tactile experience to be provided.

Figure 2:
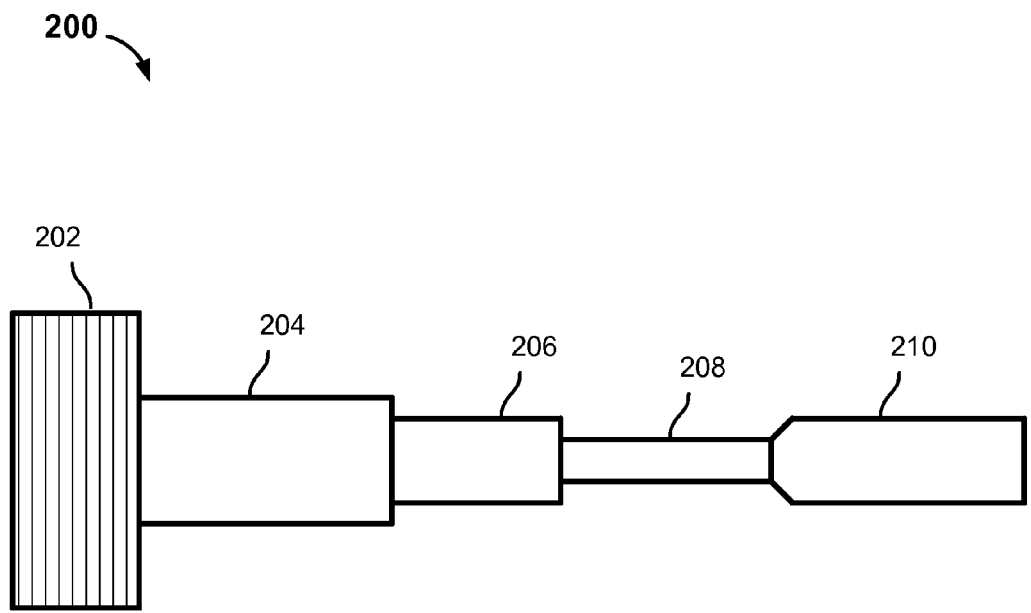
FIG. 2 is a block diagram illustrating an embodiment of a force transducer.

FIG. 2 is a block diagram illustrating an embodiment of a force transducer. In the example shown, the load cell assembly 200 includes a threaded base 202 configured with male threads to enable the based to be screwed into a female receiving portion of a transducer housing. A support block 204 adjacent to threaded base 202 provides in various embodiments four rectangular or other surfaces on which to mount calibration resistors. Adjacent to the support block 204 is a bending beam cantilevered off the support block 204. The bending beam in the example shown in FIG. 2 includes an inner beam portion 206 fixed at one end to the block 204; a reduced diameter central portion 208, which has been trimmed to a thinner diameter to control the maximum bending moment; and an outer beam portion 210 that is fixed at one end to the central portion 208 but remains free to be deflected at a distal end. The thinner the cross section of the reduced diameter central portion 208, the more flexible the transducer is. The outer beam portion 210 is sized to allow for a desired maximum deflection before hitting a stop against the transducer casing, as described below, and to accommodate the 'hat' or other cap or cover, for example a cap or cover configured to be manipulated by a thumb or other digit.

In some embodiments, mounting surfaces are provided on each of four at least partly orthogonal faces of inner beam portion 206, for example by machining faces spaced at 90 degree intervals around the inner beam portion 206 to provide substantially flat mounting surfaces. The strain gauges are bonded to a mounting surface in various embodiments using glass fusion technology. This technology was evolved for projects that required extreme conditions, and later used in mass production consumer products in order to reduce the cost (bath room scales, etc.). Glass powder is put on the beam on the location where the gauge is mounted. The beam is put in an oven and the glass powder is melted. When the beam cools down, the glass fuses into the metal beam creating a glass bead. Next, a gauge is mounted on top of the solid glass bead and the beam is put back into the oven. The glass bead melts again, and the gauge sinks into the glass. When the beam is taken out of the oven and cooled down, the glass becomes the bonding media between the beam and the gauge.

In various embodiments, once the strain gauges have been mounted as described above, measurements are performed to determine the size of calibration resistors to be placed in series with the respective strain gauges to compensate for any differences in their characteristics as measured after bonding. SMD or other resistors having the required resistance are selected and mounted on block 204. In various embodiments, the calibration resistors comprise commercially available resistors each having a standard resistance selected from a range of available discrete resistance levels. In some embodiments, the calibration resistors are mounted by wrapping around block 204 a custom flex foil or other printed circuit having attachment pads to receive the calibration resistors, i.e., to which to bond and make electrical connection to the terminals of the calibration resistors, and also electrical traces to make connection to other portions of the bridge the calibration resistors are provided to balance and pads to which to bond wires to make external connections.

Figure 3:
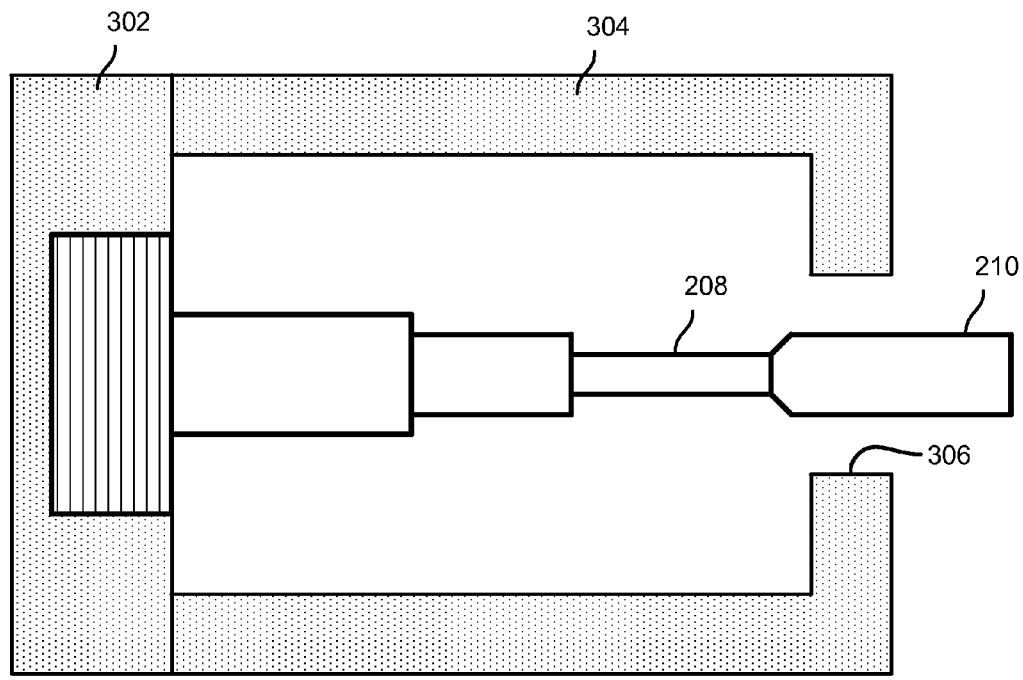
FIG. 3 is a block diagram illustrating an embodiment of a force transducer.

FIG. 3 is a block diagram illustrating an embodiment of a force transducer. In the example shown, the load cell assembly 200 has been installed in a protective outer casing that includes a base portion 302 into which the load cell assembly has been screwed and a hollow cylindrical upper casing 304 having at an end opposite base a circular end with a hole in the center through which the outer beam portion 210 of load cell assembly 200 extends. An inner surface 306 of the upper casing 304 defines the hole and acts as a mechanical stop to prevent the bending beam of load assembly 200 to be bent beyond a maximum deflection. In various embodiments, the diameter or other cross-sectional dimension(s) of central portion 208 of the bending beam is selected to enable a desired degree of deflection, within the bounds imposed by surface 306, based on an anticipated range of force input, such as a maximum or other characteristic force associated with a human user, determined for example by the strength of a typical or other user's hand. In some embodiments, thinning the central portion 208 enables a desired deflection behavior and/or "feel" to be provided to users while having sufficient size in the lower portion 206 to enable strain gauges to be mounted and to provide a transducer that is strong enough to stand up to expected use.

In some embodiments, non-thinned portions of the bending beam have a cross-sectional diameter of about 2.25 mm, which is reduced to about 2.00 mm in regions of the lower beam portion that have been machined to provide mounting surfaces for the strain gauges and thinned to about 1.70 mm in a central portion such as central portion 208. In some embodiments, the diameter (width) of the hole of the outer casing through which the outer portion 210 of the bending beam extends is about 2.65 mm (compared to the about 2.25 mm diameter of that portion of the bending beam). In some embodiments, support block 204 comprises a rectangular block that is approximately 3.50 mm wide and 6.50 mm long. In some embodiments, the bending beam includes an inner portion about 3.00 mm long, a reduced diameter central portion that is about 5.50 mm long, and an outer portion that that is about 7.50 mm long.

Figure 4:
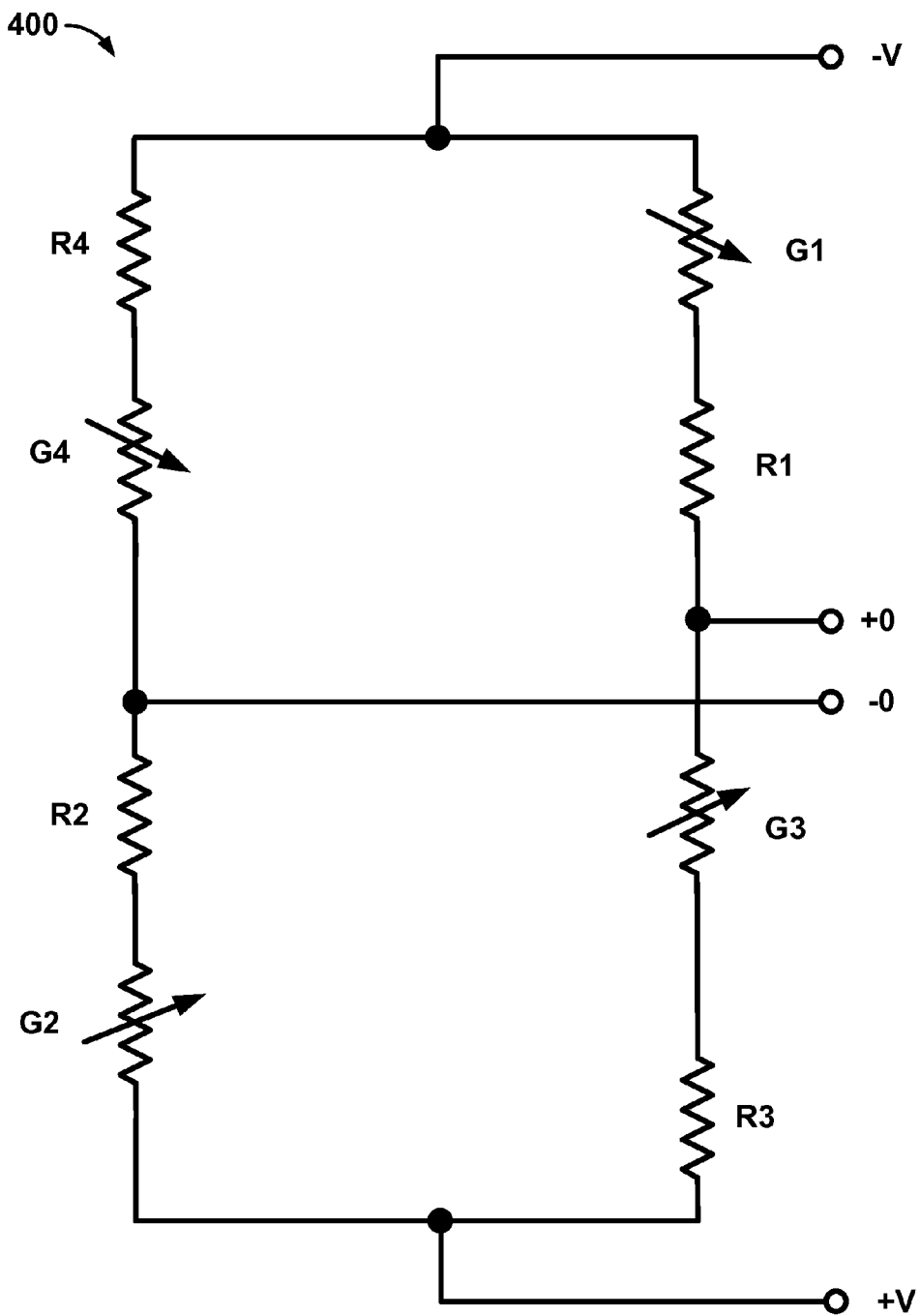
FIG. 4 is a circuit diagram illustrating a bridge that has been balanced by adding calibration resistors after strain gauges have been bonded.

FIG. 4 is a circuit diagram illustrating a bridge that has been balanced by adding calibration resistors after strain gauges have been bonded. If the example shown, bridge 400 includes strained gauges G1, G2, G3, and G4, represented as variable resistors the resistance of which vary in this case based on strain applied to the respective portions of the bending beam on which each gauge has been mounted. The calibration resistors R1, R2, R3, and R4 have been selected as described above, for example based on measurements made after the strain gauges G1-G4 have been bonded to respective mounting surfaces of the bending beam, such as by glass fusion.

Figure 5:
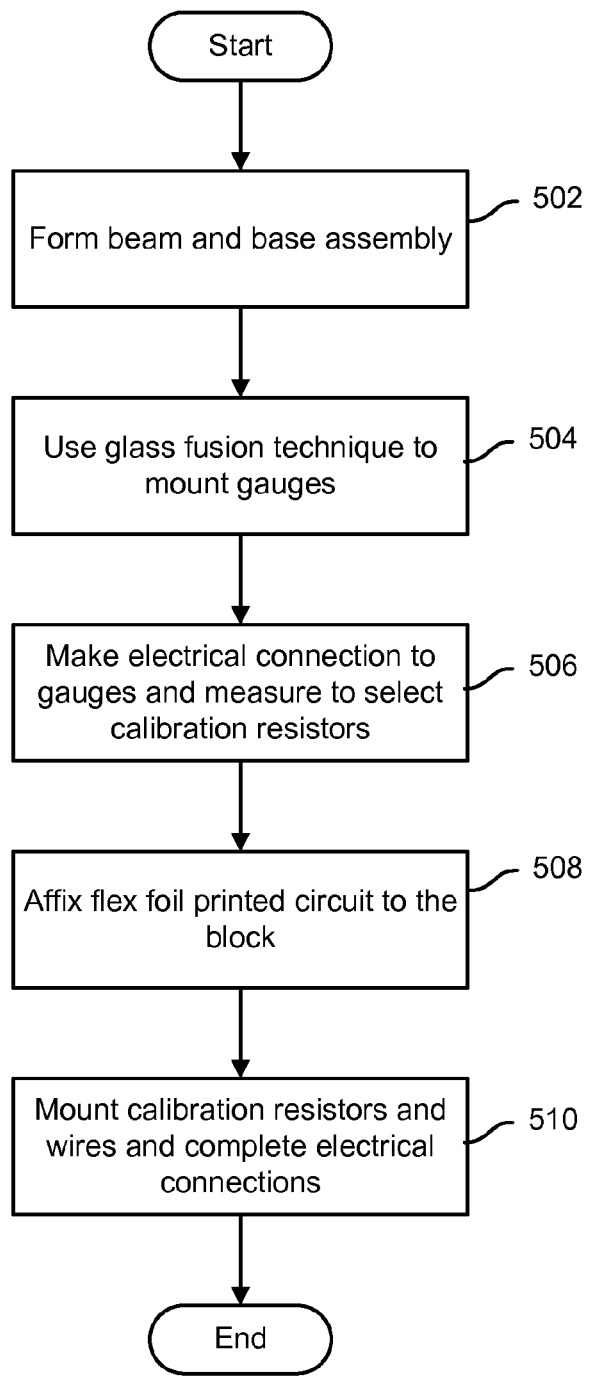
FIG. 5 is a flow diagram illustrating an embodiment of a process to manufacture a force transducer.

FIG. 5 is a flow diagram illustrating an embodiment of a process to manufacture a force transducer. In the example shown, the load cell beam and base assembly are formed (502). In some embodiments, the support block and bending beam portions are formed by selectively removing material from a single piece of input material. For example, a lathe or other tool may be used to form the bending beam portions as described above. Four faces are machined to form flat mounting surfaces on four approximately orthogonal surfaces of the lower beam portion. In some embodiments, the support block and bending beam are machined in one step by a multi axis precision 'Swiss' machine. Semiconductor strain gauges are glass fused to the respective machined surfaces (504). Electrical connection is made to the strain gauges to perform measurements required to selected calibration resistors (506). A flex foil or other flexible printed circuit is wrapped around the block, to facilitate the placement of calibration resistors and making required electrical connections to the strain gauges (508). In some embodiments, the flex foil is attached using epoxy or other adhesive. In some embodiments, the flex foil printed circuit is affixed after the gauges have been glass fused to the bending beam to avoid exposing the foil to the high temperatures required to bond the strain gauges by glass fusion. SMD or other calibration resistors having the respective resistances required to achieve a balanced bridge are selected and mounted on the support block, and wires are placed and bonded to complete the electrical connections required to bias and read output voltage levels from the force transducer load cell (510).

Using approaches disclosed herein relatively inexpensive techniques to bond strain gauges to a small scale force transducer or other load cell may be used, and the fidelity required can be achieved without using a set of strain gauges that have been presorted into carefully pre-matched sets. In addition, a durable part that provides a desired tactile experience to the user is achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of manufacturing a force transducer, comprising:

bonding via glass fusion, on each of two or more surfaces of a bending beam, one or more strain gauges;

performing one or more measurements, after bonding the strain gauges, to determine the respective resistances required to be added in series with the respective strain gauges to achieve a balanced bridge; and mounting the required calibration resistors on one or more surfaces of a support block disposed adjacent to the bending beam;

wherein the strain gauges are glass fused to the bending beam at least in part by disposing a glass powder on the bending beam, heating the bending beam in an oven to melt the glass powder and form a glass bead, placing a strain gauge on the glass bead, and heating the beam a second time to cause the gauge to sink into the glass bead.

2. The method of claim 1, wherein the bending beam is cantilevered off the support block.

3. The method of claim 1, wherein the bending beam includes a first portion on which the strain gauges are bonded and a second portion having a reduced cross-sectional diameter that is smaller than that of the first portion by an amount determined to control the maximum bending moment of the bending beam.

4. The method of claim 1, wherein the strain gauges do not comprise a pre-matched set.

5. The method of claim 1, wherein the calibration resistors comprise surface-mounted (SMD) or other small scale resistors.

6. The method of claim 1, wherein the calibration resistors comprise commercially available resistors each having a standard resistance selected from a range of available discrete resistance levels.

7. The method of claim 1, wherein mounting the required calibration resistors includes attaching a flex foil or other printed circuit to the support block.

8. The method of claim 7, wherein the flex foil or other printed circuit provides locations at which to mount the calibration resistors and includes traces that connect calibration resistors electrically to the corresponding strain gauges.

9. The method of claim 1, wherein the calibration resistors are added in series with the strain gauges.

10. A force transducer device, comprising:
a bending beam having glass fused, on each of two more mounting surfaces of the bending beam, one or more strain gauges; and a support block having mounted on one or more surfaces thereof one or more calibration resistors, each selected to achieve a balanced bridge when placed in series with one or more corresponding strain gauges;

wherein the strain gauges are glass fused to the bending beam at least in part by disposing a glass powder on the bending beam, heating the bending beam in an oven to melt the glass powder and form a glass bead, placing a strain gauge on the glass bead, and heating the beam a second time to cause the gauge to sink into the glass bead.

11. The force transducer device of claim 10, wherein the bending beam is cantilevered off the support block.

12. The force transducer device of claim 10, wherein the bending beam includes a first portion on which the strain gauges are bonded and a second portion having a reduced cross-sectional diameter that is smaller than that of the first portion by an amount determined to control the maximum bending moment of the bending beam.

13. The force transducer device of claim 10, wherein the strain gauges do not comprise a pre-matched set.

14. The force transducer device of claim 10, wherein the calibration resistors comprise surface-mounted (SMD) or other small scale resistors.

15. The force transducer device of claim 10, wherein the calibration resistors comprise commercially available resistors each having a standard resistance selected from a range of available discrete resistance levels.

16. The force transducer device of claim 10, further comprising a flex foil or other printed circuit attached to the support block and to which the calibration resistors are mounted.

17. The force transducer device of claim 16, wherein the flex foil or other printed circuit provides locations at which to mount the calibration resistors and includes traces that connect calibration resistors electrically to the corresponding strain gauges.

18. The force transducer device of claim 10, wherein the calibration resistors are connected in series with the strain gauges.

* * * * *